(12) United States Patent
Ong et al.

(10) Patent No.: US 8,478,707 B1
(45) Date of Patent: Jul. 2, 2013

(54) SYSTEM AND METHOD FOR REDUCING FLOW RULES IN FORWARDING TABLES

(75) Inventors: Joon Ong, Cupertino, CA (US); Junlan Zhou, Sunnyvale, CA (US); Arjun Singh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 12/916,822

(22) Filed: Nov. 1, 2010

(51) Int. Cl.
*G06F 17/00* (2006.01)

(52) U.S. Cl.
USPC ............................................. 706/47; 709/215

(58) Field of Classification Search
None
See application file for complete search history.

(56) References Cited

U.S. PATENT DOCUMENTS

| | | | | |
|---|---|---|---|---|
| 6,651,096 | B1* | 11/2003 | Gai et al. | 709/223 |
| 6,658,458 | B1* | 12/2003 | Gai et al. | 709/215 |
| 6,874,016 | B1* | 3/2005 | Gai et al. | 709/215 |
| 2005/0114602 | A1* | 5/2005 | Ngai et al. | 711/128 |
| 2005/0193359 | A1* | 9/2005 | Gupta et al. | 716/18 |
| 2008/0123663 | A1* | 5/2008 | Kanagala | 370/395.32 |
| 2008/0189233 | A1* | 8/2008 | Corl et al. | 706/47 |

OTHER PUBLICATIONS

Meiners C. et al., "TCAM Razor: A Systematic Approach Towards Minimizing Packet Classifiers in TCAMs", ICNP, pp. 266-275, 2007.*

Liu A. et al., "All-Match Based Complete Redundancy Removal for Packet Classifiers in TCAMs", IEEE INFOCOM, pp. 574-582, 2008.*

Dong Q. et al., Packet Classifiers in Ternary CAMs Can Be Smaller, SIGMetrics/Performance, Saint Malo, France, pp. 311-322, Jun. 2006.*

Rick McGeer, Praveen Yalagandula, Minimizing Rulesets for TCAM Implementation, 9 pages, 2009.

* cited by examiner

*Primary Examiner* — Jeffrey A Gaffin
*Assistant Examiner* — Dave Misir
(74) *Attorney, Agent, or Firm* — Lerner, David, Littenberg, Krumholz & Mentlik, LLP (57) ABSTRACT

An initial rule set in a table, such as a packet forwarding table, including a plurality of rules each having a key, an action, and a priority, may be reduced to a reduced rule set. Such reduction may include identifying relationships among the plurality of rules in the initial rule set, reassigning priority to each rule in the initial rule set based on its action and the identified relationships, duplicating all rules from each priority into each lower priority to produce an expanded rule set, and for each priority, replacing one or more of the rules with fewer inclusive rules, thereby producing a reduced rule set. Reduction may further include determining whether to perform additional rule processing on the reduced rule set, removing any redundant rules from the reduced rule set, converting any of the rules meeting a predetermined condition into don't care rules, and for each priority, replacing one or more of the rules in the reduced rule set with fewer inclusive rules.

20 Claims, 5 Drawing Sheets

SYSTEM AND METHOD FOR REDUCING FLOW RULES IN FORWARDING TABLES

BACKGROUND OF THE INVENTION

A Ternary Content Addressable Memory ("TCAM") is a type of computer memory used in certain high speed searching applications, such as routing information through a network. It is designed such that it receives a data word and searches its entire memory to see if that data word is stored anywhere in it. If the data word is found, the TCAM returns a list of one or more storage addresses where the word was found. The data word may consist of 1s, 0s, and Xs ("wildcard" bits). For example, a TCAM might have a stored word of "10XX0" which will match any of the four search words "10000," "10010," "10100," or "10110."

TCAMs, which take up a lot of power and space, are a versatile but highly constrained resource to support flexible packet processing actions on network switching devices. Next generation network applications, such as Openflow network fabrics, large firewalls, or policy-based routing, require very large sets of flow rules to enable them effectively. The small TCAMs on many devices limit the scalability of many of these applications. Therefore, it is desirous to minimize rule sets stored in TCAMs to enable network applications to operate effectively.

Attempts to minimize TCAM rule sets have been made, but these attempts are very limited. For example, one rule minimization technique supports only two known actions, as opposed to any number of arbitrary actions, which severely limits its application in network switching. Another known technology is the hardware Layer 3 IP prefix table in L3 switching devices. However, these tables only perform longest prefix match of the destination IP address and cannot handle generic flow matches as required by next-generation network applications.

SUMMARY OF THE INVENTION

One aspect of the invention provides a method for reducing an initial rule set in a packet forwarding table to a reduced rule set, the initial rule set including a plurality of rules each having a key, an action, and a priority. This method comprises identifying relationships among the plurality of rules in the initial rule set, reassigning priority to each rule in the initial rule set based on its action and the identified relationships, duplicating all rules from each priority into each lower priority to produce an expanded rule set, and for each priority, replacing one or more of the rules with one inclusive rule, thereby producing a reduced rule set. This method may further comprise determining whether to perform further rule processing on the reduced rule set, removing any redundant rules from the reduced rule set, converting any of the rules meeting a predetermined condition into don't care rules, and for each priority, replacing one or more of the rules in the reduced rule set with fewer inclusive rules.

A given one of the rules in the reduced rule set may be redundant if the key of another rule is a superset of a key of the given rule, and the another rule has a higher priority than the given rule. A given one of the keys may be a superset of another key if all wildcard bits in the another key are also wildcard bits in the superset key, and all non-wildcard bits in the another key are the same in the superset key or are wildcard bits in the superset key. A given one of the rules in the rule set may meet the predetermined condition if the key of another rule is a superset of the key of the given rule, the priority of the given rule is higher than the priority of the another rule, and the action of the given rule and the action of the another rule are the same.

In the above method, identifying relationships among the rules may comprise constructing a conflict graph, such as a directed acyclic graph. Further, the duplicated rules added to each lower priority may be added as don't care rules. These don't care rules in each priority may include the same action as other rules in that priority. Further, replacing the one or more rules in the expanded rule set with fewer inclusive rules may comprise Karnaugh map minimization. Determining whether to perform further rule processing on the reduced rule set may comprise determining whether the initial rule set is equivalent to the reduced rule set or determining whether further rule reduction is possible.

Another aspect of the invention provides a system for reducing a rule set in a packet forwarding table, the rule set including a plurality of rules each having a key, an action, and a priority. This system may comprise a storage area for storing a forwarding table, one forwarding table including a plurality of forwarding rules indexed by priority, and a processor associated with the storage area for reducing the plurality of forwarding rules. The processor may be operable to identify relationships among the plurality rules in the set, reassign priority to each rule based on its action and the identified relationships, duplicate all rules from each priority into each lower priority, and for each priority, replace one or more of the rules with fewer inclusive rules to produce a reduced rule set. The processor may be further operable to determine whether to perform further rule processing on the reduced rule set, remove any redundant rules from the reduced rule set, convert any of the rules in the reduced rule set meeting a predetermined condition into don't care rules, and for each priority, replace one or more of the rules in the reduced rule set with fewer inclusive rules.

A given one of the rules in the reduced rule set may be redundant if the key of another rule is a superset of a key of the given rule, and the another rule has a higher priority than the given rule. A given one of the rules in the reduced rule set may meet the predetermined condition if the key of another rule is a superset of the key of the given rule, the priority of the given rule is higher than the priority of the another rule, and the action of the given rule and the action of the another rule are the same.

Yet another aspect of the invention provides a computer-readable medium storing a computer-readable program for implementing a method of reducing an initial rule set in a packet forwarding table to a reduced rule set, the initial rule set including a plurality of rules each having a key, an action, and a priority. The method may comprise identifying relationships among the plurality of rules in the initial rule set, reassigning priority to each rule or the initial rule set based on its action and the identified relationships, duplicating all rules from each priority into each lower priority, and for each priority, replacing one or more of the rules with fewer inclusive rules, thereby producing a reduced rule set. The computer-implemented method may further comprise determining whether to perform further rule processing on the reduced rule set, removing any redundant rules from the reduced rule set, converting rules in the reduced rule set meeting a predetermined condition into don't care rules, and for each priority, replacing one or more of the rules in the reduced rule set with one inclusive rule. Determining whether to perform further rule processing may comprise determining whether the initial rule set (for this step) is identical to the reduced rule set.

DETAILED DESCRIPTION

Figure 1:
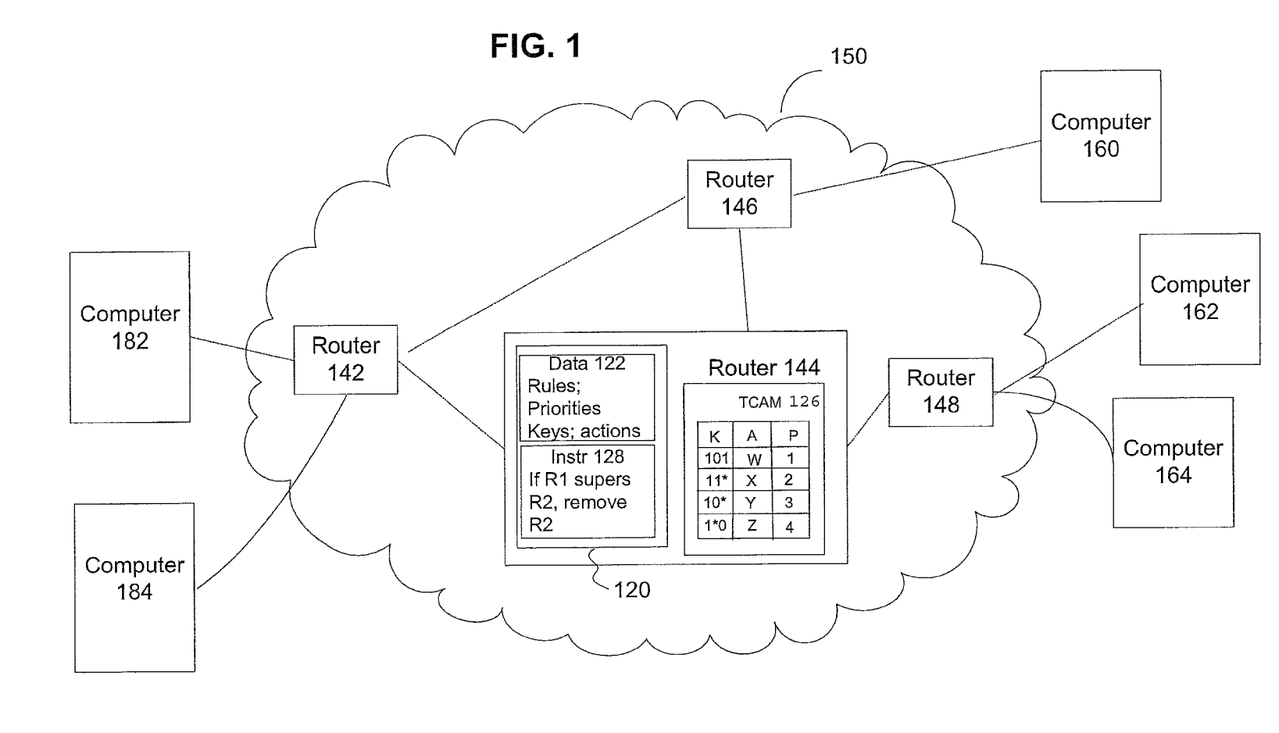
FIG. 1 is a system diagram according to an aspect of the invention.

FIG. 1 illustrates an example of a network 150 which joins a plurality of client computers 160, 162, 164, 182, 184. The network 150 includes a plurality of routers 142, 144, 146, 148. Each router 142-148 may include one or more input ports for receiving data from other routers or computing devices, such as packets or program updates. Similarly, each router 142-148 may have one or more output ports for transmitting data through the network 150. Each router 142-148 may also include one or more packet forwarding tables, such as TCAM 126 in the router 144. Further, each router may have a processor and a memory, such as the memory 120 of the router 144, which stores data 122 and instructions 128 for adding ACL rules to the TCAM 126. While TCAM 126 is shown as being stored separately from memory 120, it should be understood that the TCAM 126, data 122, and instructions 128 may all be stored in the same medium.

Memory 120 may be any of a variety of storage media, such as RAM, optical disc, magnetic storage, etc. While the memory 120 is shown as being integrated with the router 144, it should be understood that any type of hard drive or removable memory may be used. For example, the memory 120 may be a USB drive, or may be an independent storage medium coupled to one or more of the routers 142-148.

The computers 160, 162, 164, 182, 184 may be any of a variety of computing devices, including mobile devices, personal digital assistants (PDAs), laptops, PCs, etc. These devices may be connected to the network via a wired connection, such as through a modem, or wirelessly, such as through an access point in communication with one of the routers 142-148.

As shown in FIG. 1, the TCAM 126 includes a number of entries, with each entry including a rule. The rule includes a key (K), an action (A), and a priority (P). The key is an n-bit number, where each bit may be either a 1, 0, or wildcard (e.g., "*"). An exact key does not have a wildcard bit (e.g., 1101010).

As packets flow from, for example, computer 182 to computer 162, information in the packets is used to determine how the packet should be routed. For example, router 142 may use packet information to determine that the next hop should be router 144, and router 144 receives the packet and determines that the next hop should be router 148. One mechanism used by the routers (e.g., router 144) to make such determination is the TCAM 126. For example, the packet may include a key, which matches one of the keys K in TCAM 126. Depending on the key K which matches the packet key, a specified action (A) is taken with respect to the packet.

In some circumstances, keys may overlap. For example, if there is an exact key which matches both a first key (K1) and a second key (K2), then K1 overlaps K2. For example, if K1=110*, and K2=1*01, both K1 and K2 match exact key=1101. Therefore, K1 and K2 overlap. In this regard, if a bit in K1 and the corresponding bit in K2 are non-wildcards, those bits must be identical.

In other circumstances, one key may be a superset of another key. For example, if all exact keys matching K2 also match K1, then K1 is a superset of K2. For example, if K1=1*1*1, and K2=101*1, and key matching K2 would also match K1, and thus K1 is a superset of K2. In this regard, all wildcard bits of K2 are also wildcard bits in K1, and for each non-wildcard bit in K2, the corresponding bit in K1 is either identical or a wildcard.

Rules may also have particular relationships with other rules. For example, a rule may conflict with another rule, "subsume" another rule, or "supersume" another rule. A rule (R1) may conflict with another rule (R2) if R1 is higher priority than R2, the key of R1 overlaps with the key of R2, and R1 and R2 have different actions. Rule R1 may subsume rule R2 if R1 is lower priority than R2, the key of R1 is a superset of the key for R2, and the actions of R1 and R2 are the same. R1 may supersume R2 if the key for R1 is a superset of the key for R2, and R1 is higher priority than R2.

Some rules may also be classified as "don't care" rules if they can be dropped without changing the behavior of the rule set. However, they are kept in the intermediate/working rule set to possibly aid key aggregation of other rules. For example, R2 is classified as a don't care rule if it has the same key as R1, and a lower priority than R1. A rule R2 can be duplicated from R1 with the same key as R1, a lower priority than R1, with an arbitrary action and be classified as a "don't care" rule.

Some further relationships between rules may also be observed. For example, a function HitRule(RS, K) returns a rule in rule set (RS) that matches key K. Given rule set (RS) and exact input key (K), HitRule(RS, K)=Rule R, if (1) the key of R is a superset of the exact input key K; and (2) there does not exist any rule R' in the rule set RS, such that R' has higher priority than R and the key of R' is a superset of the exact input key K.

A further example of a relationship between rules may be seen with respect to a function Action(RS,K), which returns an action of a rule corresponding to an input key K in a rule set RS. Given rule set (RS) and exact input key (K), Action(RS, K)=Action(R), where R is the highest priority rule, such that the key of R is a superset of the exact input key K. That is, the action corresponding to exact input key K in the rule set RS will be equivalent to the action for the highest priority rule R whose key is a superset of exact input key K. In contrast, Action(RS,K)=Null, if there does not exist any rule R in RS having a key which is a superset of K.

According to an aspect of the present invention, the number of entries in the TCAM 126 may be reduced, thereby preserving resources and reducing cost. For example, the number of entries may be reduced according to a method described in detail below with respect to FIG. 2. This method may be stored as a set of data and instructions in memory 120, and executed by a processor integral with or coupled to the router 144.

Figure 2:
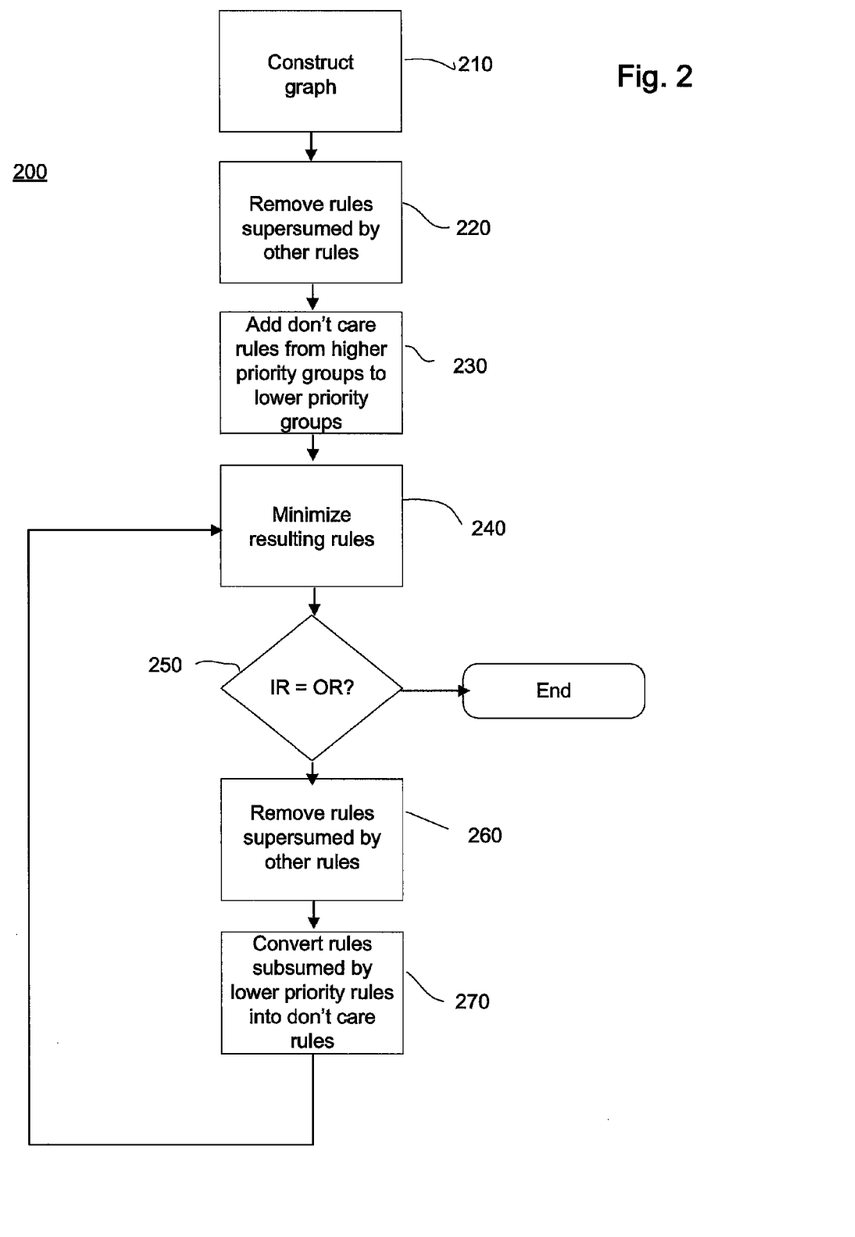
FIG. 2 is a flow diagram of a method for reducing a rule set according to an aspect of the invention.

FIG. 2 illustrates a method 200 for reducing TCAM entries. Each step transforms a set of input rules (IR) to a set of output rules (OR). The output rules OR may be reduced in number or form with respect to the input rules IR. However, in substance the IR and OR are equivalent. That is, the behaviors (e.g., forwarding behavior of the TCAM will not be affected by converting the IRs to ORs. Accordingly, an explanation of the equivalence of the input rules IR to the output rules OR is provided after each step is described.

In step 210, a graph is constructed using a rule set $V_1$. The rule set $V_1$ may include all the rules in the TCAM 126, or a subset of those rules, sorted by priority.

Figure 3:
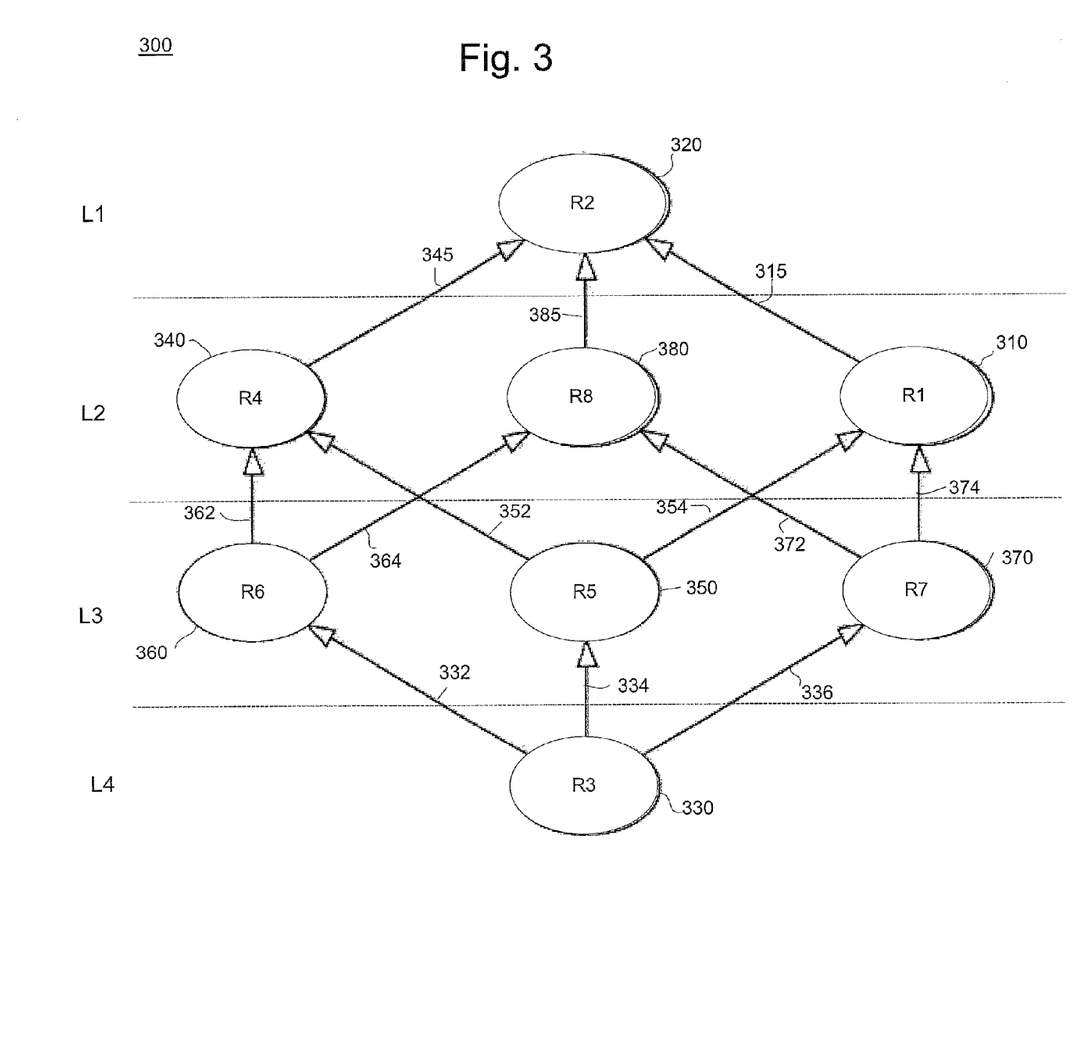
FIG. 3 is a conflict graph according to an aspect of the invention.

An exemplary conflict graph is shown in FIG. 3. As shown, the graph may be a directed acyclic graph, including a plurality of vertexes 310, 320, 330, 340, 350, 360, 370, 380. Each vertex 310-380 represents a rule in the set V (e.g., vertex 310 represents R1, vertex 320 represents R2, etc.). Each edge 345, 315, 362, 364, 352, 354, 372, 374, 332, 334, 336, and 385 represents a conflict between two rules. For example, the edge 345 indicates that R4 (vertex 340) conflicts with R2 (vertex 320). Similarly, R3 (vertex 330) conflicts with rules R6, R5, and R7, as represented by edges 332, 334, 336, respectively.

Figure 4:
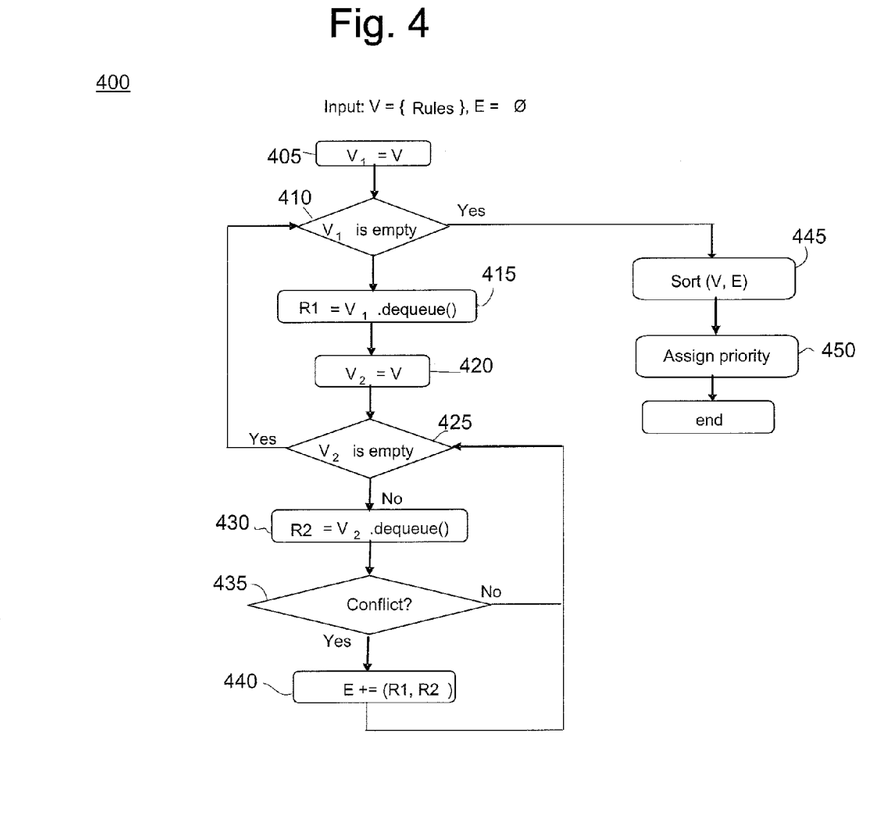
FIG. 4 is a method for constructing a conflict graph according to an aspect of the invention.

The graph 300 may be generated according to the exemplary method 400, shown in FIG. 4. In step 405, the rule set $V_1$, which as mentioned above may be all entries in the TCAM 126 or a subset of those entries, is established. In step 410, it is determined whether this set $V_1$ is empty, in which case analysis of the rules in the set $V_1$ is complete. However, if the set is not empty, a first rule R1 is selected from the set in step 415, and a vertex is created for R1. For example, looking to graph 300, the vertex 310 is created for R1. The first selected rule R1 may then be removed from the set $V_1$ established in step 405.

In step 420, a second set of rules $V_2$ to be compared with rule selected from the first set (e.g., R1) is established. The second set of rules $V_2$ may include the same rules as the first set $V_1$. It is determined at step 425 whether this second rule set $V_2$ is empty, and if so the process returns to step 410. However, if the second set is not empty, a second rule R2 is selected. A vertex is created for R2 in step 430, and the rule R2 is removed from the second rule set $V_2$. Keeping with the example shown in FIG. 3, the second selected rule R2 may be represented by vertex 320.

It is then determined at step 435 whether R1 conflicts with R2. For example, it may be determined whether R1 meets a set of predetermined conditions with respect to R2 (e.g., R1 has higher priority than R2, the key for R1 overlaps with the Key for R2, and the actions for R1 and R2 are different). If it is determined that R1 conflicts with R2, a directed edge is drawn from R1 to R2 in step 440. For example, the edge 315 in FIG. 3 represents that R1 conflicts with R2. If, however, it is determined in step 435 that no conflict exists, the process returns to step 425.

Once it is determined at step 410 that there are no further rules to be analyzed, the process proceeds to step 445, where the vertexes are sorted. The graph 300 may be sorted topologically. For example, rules having no conflicts with other rules, such as R2 (vertex 320), may be moved to a top level, L1. Then rules that have a conflict with L1 level rules are temporarily assigned to a next level, L2. Further rules which have conflict with L2 rules, are assigned to a next level, L3. No conflicting rules share the same level.) This process may be continued until no two conflicting rules are in the same level.

In step 450, rules may be assigned new priorities based on their positioning in the topologically sorted graph. For example, each rule at level L1 may be assigned a highest priority, while each respective level includes rules assigned with a lower priority. Thus, following the example of FIG. 3, rule R2 (vertex 320) may be assigned a highest priority (P1). Rules R4, R8, and R1 may be assigned a second highest priority (P2). Rules R6, R5, and R7 may be assigned a third highest priority (P3). And rule R3 may be assigned a lowest priority (P4).

The reassignment of priorities does not substantively change the rules in the set $V_1$ that are analyzed in the method 400 (FIG. 4) and graphed in step 210 (FIG. 2). That is, the relationship of IR=OR is preserved. For example, for each key (K), the action corresponding to key K for the input rules will be the same as the action corresponding to K for the output rules, because the relative priorities of conflicting rules were maintained. No keys or actions were changed.

Returning to FIG. 2, in step 220, an analysis is performed on the rules R1-R8 having newly assigned priorities. During this analysis, the rules are compared to determine if one rule supersumes another. For example, it may be determined whether R2 supersumes R1 (i.e., whether the key for R2 is a superset of the key for R1, and R2 is higher priority than R1). If this is the case, R1 may be removed. Once the rules supersumed by other rules are removed, the resulting rule set may be output.

The rule set output from step 220 will be equivalent to the rule set output from step 210. That is, for any key (K), Action (IR, K)=Action(OR, K). For example, if HitRule(IR,K) =NULL, HitRule(OR,K)=NULL also, because OR is a subset of IR. Further, for example, if HitRule(IR,K)=R2, and R2 is removed, there must exist another rule which supersumes R2. Even further, if HitRule(IR,K)=R1, and R1 is in OR, then HitRule(OR,K)=R1 also.

In step 230, "don't care" rules duplicated from higher priority groups are added to lower priority groups. For example, for each priority level L1-L4 in FIG. 3, a sub-priority is created for each action. Thus, for example, if R4 includes action A1, and R8 and R1 include action A2, two sub-priorities would be created in level L2—one for R4 and one for R8 and R1. Accordingly, assume rule R2 in level L1 has priority P1. Rule R4 in level L2 now has priority $P2_1$ and rules R8 and R1 both have priority $P2_2$. The priorities of the rules may then be changed, so that R2 has priority P1, rule R4 has priority P2, and rules R8 and R1 have priority P3.

Also in step 230, a don't care rule is added to each new priority group from higher priority groups. For example, rule R2 is duplicated as a don't care rule in new priorities P2 and P3. Rule R4 is duplicated as a don't care rule in priority P3. Adding these don't care rules to the lower priorities provides a greater potential for simplifying the rules later on. For example, an all encompassing rule may be substituted for a plurality of simpler rules.

The resulting rules from the relabeled priority groups are then collected as output rules OR. These output rules OR from step 230 are still equivalent to the output rules from step 220, because the relative priority of any conflicting rule is preserved. For example, if HitRule(IR,K)=R1, then HitRule(OR, K)=R1 also, because the don't care rules were only added to lower priority groups. Therefore, a duplicated (don't care) rule matching key K will not be returned, because it will be trumped by the higher priority explicit (non-don't care) rule matching key K.

In step 240, the rules resulting from step 230 are minimized. For each newly assigned priority, the set of keys may be expressed as one or more inclusive rules. Using the example discussed above with respect to step 230, rule R8 and R1 were both assigned priority P3. Also, duplicates of rules R2 and R4 were added to priority group P3 as don't care rules. Thus, for example, prior to step 240, priority group P3 may have included the following:

R8: 1*1 A2 P3
R1: 10* A2 P3
R2: 111 A2 P3
R4: 1*0 A2 P3, where the underlined rules indicate don't care rules. These four rules may be collapsed into one rule {R: 1** A2 P3} which encompasses each of rules R8, R1, R2, and R4. Such minimization may be performed using any of a variety of logic minimization tools, such as Karnaugh maps, etc.

In step 260, any rules supersumed by other rules are removed, similar to step 220. For example, it may be determined whether R2 supersumes R1 (i.e., whether the key for R2 is a superset of the key for R1, and R2 is higher priority than R1). If this is the case, R1 may be removed. Once the rules supersumed by other rules are removed, the resulting rule set, including any don't care rules, may be output.

In step 270, rules that are subsumed by lower priority rules and that don't conflict with any other rules in between may be converted into don't care rules. For example, each rule may be analyzed from highest to lowest priority. For a rule R1, there may exist a rule R2 which subsumes R1 (i.e., rule R2 subsumes R1 if R2 is lower priority than R1, the key for R2 is a superset of the key for R1, and the actions of R2 and R1 are the same. Accordingly, subsumed rule R1 may be converted into a don't care rule if there is no other rule (R3) that conflicts with R1 and has higher priority than R2.

The process may then proceed to step 240, where the resulting rules are again minimized. In step 250, it is determined whether IR=OR. For example, after the iteration of steps 260, 270 and 240, it may be determined at step 250 whether the output rules minimized in step 240 are identical to the rules input at step 210. If it is determined that the rules are identical, the process may be ended. However, if they are not identical (or if further minimization is possible), further processing may be performed, for example by repeating steps 260-270.

This iteration of steps 260, 270, and 240 may be repeated until it is determined in step 250 that the resulting output rules are identical.

Figure 5:
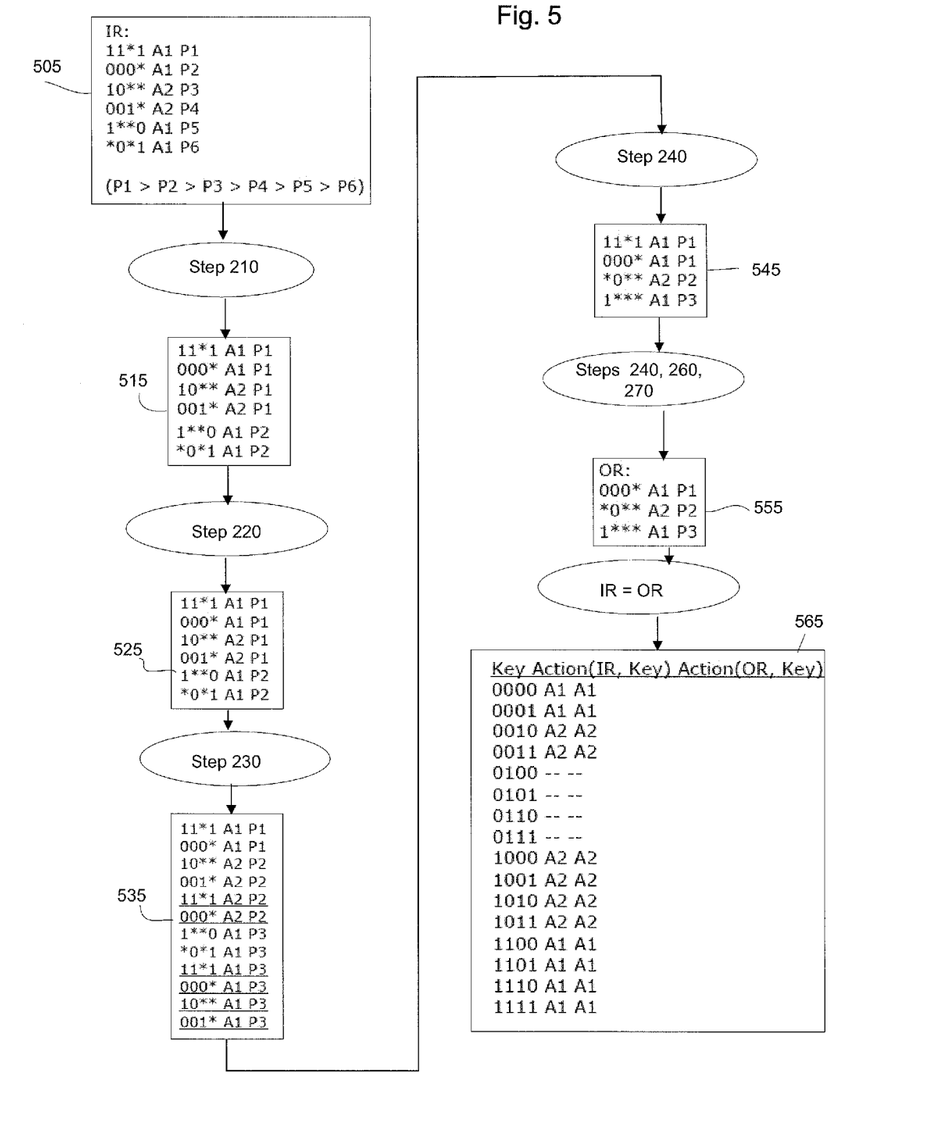
FIG. 5 is a step-wise transformation of an exemplary data set according to the method of FIG. 2.

FIG. 5 illustrates the process of FIG. 2 using exemplary data, and shows how the data is modified through each step. The process begins with the input rules (IR) in box 505. The input rules include various keys and actions, and are listed in order of priority, from highest priority to lowest.

After step 210, where the directed conflict graph is constructed and priorities of the rules are reassigned based on their position in the graph, the resulting rule set is shown in block 515. In this example, the rules are now grouped into only two priorities (P1 and P2) as opposed to the six priorities (P1, P2, P3, P4, P5, P6). However, the relative priority of each rule is preserved.

After step 220, where rules supersumed by other rules are removed, no change is seen to the rule set in block 525. In the exemplary rule set shown in block 515, no rules appear to be subsumed by other rules. Accordingly, the data remains the same.

After step 230, where sub-priorities are created, priorities are re-assigned based on sub-priorities, and don't care rules are added from higher priority groups to lower priority groups, the resulting rule set in shown in block 535. Because rules {11*1, A1, P1} and {000*, A1, P1} in block 525 share the same action and the same highest priority, these rules remain the same in block 535. However, the next two rules of block 525, {10**, A2, P1} and {001*, A2, P1}, share the same action and priority as each other, and have the same priority as the first two rules, but their actions are different than the first two rules. Accordingly, they are assigned a sub-priority based on their different action in the P1 group, and reassigned to priority P2 in block 535. Similarly, the last two rules of block 525, {1**0, A1, P2} and {*0*1, A1, P2} are reassigned priority P3 in block 535.

In addition to the reassigned priorities, the rule set in block 535 includes duplicates of higher priority rules in lower priority groups. For example, the highest priority rules of block 535, {11*1, A1, P1} and {000*, A1, P1}, are repeated as don't care rules {11*1, A2, P2} and {000*, A2, P2} in reassigned priority group P2. The actions of these don't care rules are also changed to correspond to the actions of the reassigned priority group. Similarly, the four rules of reassigned priority groups P1 and P2 are added to reassigned priority group P3 as don't care rules.

After the rule set of block 535 is minimized in step 240, the resulting rule set appears in block 545. As shown, the first two rules {11*1, A1, P1} and {000*, A1, P1} remain the same. However, the addition of don't care rules to reassigned priority groups P2 and P3 facilitated reduction of the rules in those respective priorities. For example, the two explicit rules and two don't care rules in priority group P2 in block 535 are reduced to one rule which encompasses these rules in block 545. Similarly, the six rules (two explicit and four don't care) in reassigned priority group P3 of block 535 are also reduced to one rule in block 545.

The rule set of block 545 is further processed in steps 260 and 270, where rules supersumed by other rules are removed, and rules subsumed by lower priority rules are converted into don't care rules. Thus, for example, while no rules in block 545 appear to be supersumed by other rules, the first rule {11*1, A1, P1} is subsumed by lower priority rule {1***, A1, P3}. Accordingly, the first rule {11*1, A1, P1} is converted to a don't care rule prior to minimization in step 270. Though not shown, the iteration of steps 260, 270, and 240 may be repeated until it is determined that the rules input to step 210 are identical to the rules output from step 240. The resulting rule set is shown in block 555.

The rule set shown in block 555 is equivalent to the rule set shown in block 505, but reduced in size. For example, an exact input key 1011 matched against the rule set 505 would hit rule {10**, A2, P3}, because it is the highest priority match. The same input key matched against the rule set of block 555 would match rule {*0**, A2, P2}, which is the highest priority match. Thus, the same action would be taken for the exact input key 1011 in either rule set 505 or 555. Similarly, the same action would be taken for any exact input key matched against the rules sets of block 505 and 555, because the actions and relative priorities have been preserved.

Block 565 proves that the input rules of block 505 are equivalent to the output rules of block 555. Particularly, block 565 lists each possible exact input key, the action that would be taken with respect to the input rules of block 505, and the action that would be taken with respect to the output rules of block 555. As seen, the actions for each exact key are the same for the input rules and the output rules.

The above-described methods for minimizing rule sets in TCAMs may be executed by one or more processors in or connected to the routers 142-148 in network 150 at FIG. 1. For example, software for performing the rule minimization may be stored in the memory 120 in the router 144, or in a remote storage medium, and executed by a processor in the router 144 or by a remote processing device. According to one aspect, a single storage media and processor may be accessed by a plurality of routers.

The above methods may be performed at any time, such as prior to population of the TCAM, when an update (e.g., adding a rule or deleting a rule) is required, or periodically for maintenance or other purposes. Where the method is implemented as software (e.g., executable code stored in memory 120) and executed by a processor in the router, this software application may be automatically run at predetermined times. For example, a processor may be programmed to perform the steps of the methods 200 or 400. However, the methods may, according to one aspect, be implemented a network manager.

While the above-described methods for minimizing rule sets have been described with respect to actions such as packet forwarding, it should be understood that this is only one example of packet processing supported by TCAMs. Further examples of packet processing, for which the rule minimization techniques according to the present invention may be implemented, include access control/security applications etc.

The above described methods for minimizing rule sets are beneficial as they increase storage and processing capabilities of routers. In turn, network performance may be improved. For example, networks may be capable of handling increased transmissions and overall transmission time may be reduced, and network size may be increased without sacrificing quality of service. Additionally, the cost of implementing networks may be reduced because the resources will be used most efficiently. Furthermore, behaviors are not affected during the minimization, enabling packets to be continually transmitted through the network 150 during the minimization.

Although aspects of the invention have been described with reference to particular embodiments, it should be understood that these examples are merely illustrative of the principles and applications of the invention. For example, it should be understood that the described system and method may be implemented over any network, such as the Internet, or any private network connected through a router. The network may be a virtual private network operating over the Internet, a local area network, or a wide area network. Additionally, it should be understood that numerous other modifications may be made to the illustrative embodiments and that other arrangements may be devised without departing from the spirit and scope of the present invention as defined by the appended claims.

The invention claimed is:

1. A method for reducing an initial rule set in a packet forwarding table to a reduced rule set, the initial rule set including a plurality of rules each having a key, an action, and a priority, the method comprising:
   identifying relationships among the plurality of rules in the initial rule set;
   reassigning priority to each rule in the initial rule set based on its action and the identified relationships;
   adding a rule having a key identical to that of an existing rule, the added rule having a priority lower than that of the existing rule; and
   for each priority, replacing one or more of the rules with fewer inclusive rules to produce the reduced rule set.

2. The method of claim 1, further comprising:
   determining whether to perform further rule processing on the reduced rule set;
   removing any redundant rules from the reduced rule set;
   converting any of the rules in the reduced rule set meeting a predetermined condition into don't care rules; and
   for each priority in the reduced rule set, replacing one or more of the rules with fewer inclusive rules.

3. The method of claim 2, wherein a given one of the rules in the reduced rule set is redundant if:
   the key of another rule is a superset of a key of the given rule; and
   the another rule has a higher priority than the given rule.

4. The method of claim 3, wherein a given one of the keys is a superset of another key if:
   all wildcard bits in the another key are also wildcard bits in the superset key; and
   all non-wildcard bits in the another key are the same in the superset key or are wildcard bits in the superset key.

5. The method of claim 2, wherein a given one of the rules in the reduced rule set meets the predetermined condition if:
   the key of another rule is a superset of the key of the given rule;
   the priority of the given rule is higher than the priority of the another rule; and
   the action of the given rule and the action of the another rule are the same.

6. The method of claim 1, wherein identifying relationships among the rules comprises constructing a conflict graph.

7. The method of claim 6, wherein the conflict graph is a directed acyclic graph.

8. The method of claim 1, wherein the added rule is a don't care rule.

9. The method of claim 8, wherein the don't care rules in each priority include the same action as other rules in that priority.

10. The method of claim 1, wherein replacing the one or more rules with fewer inclusive rules comprises Karnaugh map minimization.

11. The method of claim 1, wherein replacing the one or more rules with fewer inclusive rules comprises using binary decision diagrams.

12. The method of claim 2, wherein determining whether to perform further rule processing on the reduced rule set comprises determining whether the initial rule set is identical to the reduced rule set.

13. A system for reducing a rule set in a table, the rule set including a plurality of rules each having a key, an action, and a priority, the system comprising:
   a storage area for storing a table, the table including a plurality of rules indexed by priority;
   a processor associated with the storage area for reducing the plurality of forwarding rules, the processor being operable to:
      identify relationships among the plurality rules in the set;
      reassign priority to each rule based on its action and the identified relationships;
      add a rule having a key identical to that of an existing rule, the added rule having a priority lower than that of the existing rule; and
      for each priority, replace one or more of the rules with fewer inclusive rules to produce a reduced rule set.

14. The system of claim 13, wherein the processor is further operable to:
   determine whether to perform further rule processing on the reduced rule set;
   remove any redundant rules from the reduced rule set;
   convert any of the rules in the reduced rule set meeting a predetermined condition into don't care rules; and
   for each priority, replace one or more of the rules in the reduced rule set with fewer inclusive rules.

15. The system of claim 14, wherein a given one of the rules in the reduced rule set is redundant if:
   the key of another rule is a superset of a key of the given rule; and
   the another rule has a higher priority than the given rule.

16. The system of claim 14, wherein a given one of the rules in the reduced rule set meets the predetermined condition if:
   the key of another rule is a superset of the key of the given rule;
   the priority of the given rule is higher than the priority of the another rule; and
   the action of the given rule and the action of the another rule are the same.

17. A non-transitory computer-readable medium storing a computer-readable program for implementing a method of reducing an initial rule set in a packet forwarding table to a reduced rule set, the initial rule set including a plurality of rules each having a key, an action, and a priority, the method comprising:
- identifying relationships among the plurality of rules in the initial rule set;
- reassigning priority to each rule r in the initial rule set based on its action and the identified relationships;
- adding a rule having a key identical to that of an existing rule, the added rule having a priority lower than that of the existing rule; and
- for each priority, replacing one or more of the rules with fewer inclusive rules, thereby producing the reduced rule set.

18. The non-transitory computer-readable medium of claim 17, the method further comprising:
- determining whether to perform further rule processing on the reduced rule set;
- removing any redundant rules from the reduced rule set;
- converting rules in the reduced rule set meeting a predetermined condition into don't care rules; and
- for each priority, replacing one or more of the rules in the reduced rule set with fewer inclusive rules.

19. The non-transitory computer-readable medium of claim 18, wherein determining whether to perform further rule processing comprises determining whether the initial rule set is identical to the reduced rule set.

20. The non-transitory computer-readable medium of claim 17, wherein identifying relationships among the rules comprises constructing a conflict graph.

* * * * *

UNITED STATES PATENT AND TRADEMARK OFFICE
CERTIFICATE OF CORRECTION

PATENT NO.        : 8,478,707 B1                      Page 1 of 1
APPLICATION NO.   : 12/916822
DATED             : July 2, 2013
INVENTOR(S)       : Joon Ong et al.

It is certified that error appears in the above-identified patent and that said Letters Patent is hereby corrected as shown below:

In the Claims

Column 11, line 6, includes "rule r in the" should read --rule in the--.

Signed and Sealed this
Twelfth Day of May, 2015

Michelle K. Lee
*Director of the United States Patent and Trademark Office*